(12) United States Patent
Hagberg et al.

(10) Patent No.: US 7,485,985 B2
(45) Date of Patent: Feb. 3, 2009

(54) ROTARY SWITCH

(75) Inventors: Yngve Hagberg, Gothenburg (SE); Lasse Ryden, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 43 days.

(21) Appl. No.: 10/709,145

(22) Filed: Apr. 15, 2004

(65) Prior Publication Data

US 2004/0195080 A1    Oct. 7, 2004

Related U.S. Application Data

(63) Continuation of application No. PCT/SE02/01790, filed on Oct. 1, 2002, now abandoned.

(30) Foreign Application Priority Data

Oct. 15, 2001    (SE) .................................... 0103420

(51) Int. Cl.
*B60L 1/14* (2006.01)
*H01H 67/26* (2006.01)
*H01H 13/14* (2006.01)

(52) U.S. Cl. .................... 307/10.8; 200/179; 200/519; 200/523

(58) Field of Classification Search ............... 307/10.8; 200/179, 519, 523–528
See application file for complete search history.

(56) References Cited

U.S. PATENT DOCUMENTS

| | | | | |
|---|---|---|---|---|
| 2,598,613 A * | 5/1952 | Simoni | .................. | 200/461 |
| 3,500,120 A * | 3/1970 | Rudd | .................. | 315/82 |
| 3,984,797 A * | 10/1976 | Rayburn | .................. | 335/306 |
| 4,032,731 A * | 6/1977 | Bryceland | .................. | 200/16 B |
| 4,164,633 A | 8/1979 | Sheridan et al. | .................. | 200/4 |
| 4,225,758 A | 9/1980 | Kondo et al. | .................. | 200/4 |
| 4,518,832 A | 5/1985 | Geremia | .................. | 200/4 |
| 4,885,434 A | 12/1989 | Vultaggio et al. | .................. | 200/4 |
| 4,891,475 A * | 1/1990 | Wiersing et al. | .................. | 200/5 R |
| 4,900,946 A * | 2/1990 | Williams et al. | .................. | 307/10.1 |
| 5,281,779 A | 1/1994 | Bogovican et al. | .................. | 200/5 |
| 5,491,311 A | 2/1996 | Muscat et al. | .................. | 200/4 |
| 5,546,067 A | 8/1996 | Schmidt et al. | .................. | 338/172 |
| 5,736,696 A | 4/1998 | Del Rosso | .................. | 200/5 |
| 5,773,935 A | 6/1998 | Wagner et al. | .................. | 315/77 |
| 6,034,337 A | 3/2000 | Siegert | .................. | 200/50.32 |

FOREIGN PATENT DOCUMENTS

| | | |
|---|---|---|
| DE | 4323083 A1 | 1/1995 |
| DE | 19936385 A1 | 2/2001 |
| EP | 034786 A1 | 12/1989 |
| EP | 0342031 A2 | 12/1989 |
| EP | 765775 A1 * | 4/1997 |
| WO | WO 0048215 A1 | 12/1989 |

* cited by examiner

*Primary Examiner*—Michael J Sherry
*Assistant Examiner*—Hal I Kaplan
(74) *Attorney, Agent, or Firm*—Novak Druce + Quigg, LLP

(57) ABSTRACT

A rotary switch for vehicles including a plurality of fixed rotational positions and several spring-loaded axial positions. A first axial position is activated by a pushing movement and a second axial position is activated by a pulling movement.

11 Claims, 1 Drawing Sheet

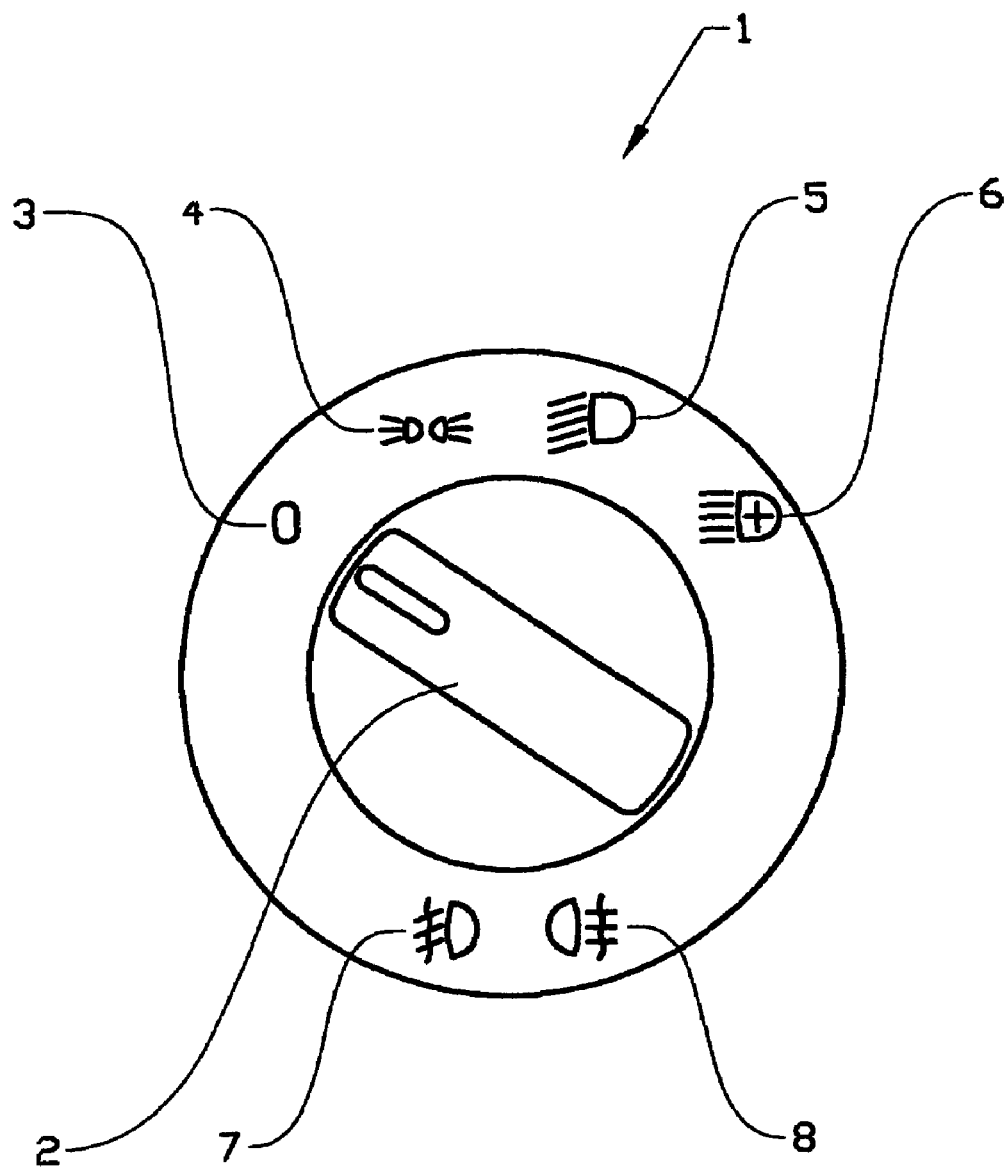

ROTARY SWITCH

CROSS REFERENCE TO RELATED APPLICATIONS

The present application is a continuation patent application of International Application No. PCT/SE02/01790 filed 1 Oct. 2002 which was published in English pursuant to Article 21(2) of the Patent Cooperation Treaty, and which claims priority to Swedish Application No. 0103420-6 filed 15 Oct. 2001. Both applications are expressly incorporated herein by reference in their entireties.

BACKGROUND OF INVENTION

1. Technical Field

The present invention relates to a rotary switch for vehicles having a plurality of rotational positions for operating a plurality of different lighting groups and several spring-loaded axial positions for operating several different lighting groups, as well as a method for controlling electronic functions in vehicles utilizing such a switch.

2. Background Art

In modern vehicles there are many functions that are controlled electronically. Some of these functions are of the on/off type and require no other control than a simple switch, for example certain light functions. Some functions, however, can be switched to several positions, for example windscreen wipers. The control of these functions is carried out using some form of switch with several positions. A switch can either be a full-load switch, where the load is connected directly to the switch, or a low-level switch, where the load is connected to a power unit, for example a relay, which is controlled by the switch.

A problem with having many electronic functions and hence many switches, is that the location of the switches can easily become confusing. Another problem is that the switches should be located within easy reach of the driver. This can be a disadvantage, particularly in trucks and busses that usually have many more switches than automobiles. In addition, for the sake of driver clarity, it is desirable to have all the switches that control the same type of function collected in a defined group.

A common way of limiting the number of switches is to use multi-function switches or multi-function modules; for example, all light functions on a vehicle can be controlled by one switch or by a module in which the switches for controlling the light functions are integrated.

A rotary switch that is known to the skilled person in the field has three rotational positions; the first position denoting switched-off lights, the second position denoting parking lights and the third position denoting full/dipped beam of the headlamps. In addition, this switch has two pulled-out positions for fog lamps, by which the front and rear fog lamps are controlled. The pulled-out positions are controlled mechanically in such a way that the fog lamps can only be activated in the third rotational position. When the rotary switch is turned towards the first position, the fog lamps are deactivated.

A disadvantage of this type of switch is that it is expensive and complicated to achieve the mechanical control for the pulled-out positions. In addition, several different versions of the switch are required to cover the different combinations of possible functions that are required. Another disadvantage is that front and rear fog lamps cannot be controlled individually. A further disadvantage is that the pulled-out positions of the switch are not reset automatically when the vehicle's engine is switched off. Depending upon how the fog lamp function is implemented, this can mean that the driver can inadvertently leave the fog lamps switched on or that the driver can believe that the fog lamps are activated when they are actually switched off. In addition, there can be legal requirements for the fog lamp function to be deactivated when the vehicle's engine is started up.

Similar rotary light switches with one or more pulled-out positions are described in, for example, WO 00/48215, U.S. Pat. Nos. 5,546,067, 4,164,633, 5,491,311, 4,885,434 and EP 0342031.

Another rotary switch that is known to experts in the field has a similar function with rotational positions and two pulled-out positions for fog lamps. This switch has an electromagnet that holds fast a spring-loaded control element in the pulled-out positions of the switch. When the vehicle's engine is switched off or when the rotary switch is turned towards the zero position, the electromagnet releases the control element that returns to its normal position.

Disadvantages of this switch are that it is expensive and complicated. Several different versions of the switch are also required for this switch to cover the different combinations of possible functions that are required. Another disadvantage is that front and rear fog lamps cannot be controlled individually.

A third way of solving the problem of lack of space and clarity is to arrange a rotary switch with a number of two-way switches in a module. Examples of this solution are described in, for example, U.S. Pat. Nos. 5,773,935, 5,736,696, 6,034,337 and 5,281,779.

SUMMARY OF INVENTION

An object of the invention is to achieve a rotary switch, which in one version makes possible a plurality of axial functions, and a method for activating different electronic functions in as logical a way as possible.

Regarding the instant rotary switch for vehicles that includes a number of rotational positions and at least one axial position, an object of the invention is achieved by at least one axial position being spring-loaded. The method according to the invention for controlling a plurality of electronic functions by means of a spring-loaded rotary switch solves the problem by a first function being activated by a first pushing movement in from a neutral position and a second function being activated by a first pulling movement out from the neutral position.

According to this first embodiment of the inventive rotary switch, a rotary switch is obtained with at least one axial momentary function option. The advantage of such a rotary switch is that it is possible to control electronic functions on a vehicle in a flexible and logical way.

In an advantageous first further development of the system according to the invention, the axial position is activated by a pushing movement or by a pulling movement in from or out from a neutral position, respectively. The advantage of this is that the activation of the axial function can be logically related to the physical function.

In an advantageous second further development of the system according to the invention, a rotary switch is obtained with two axial momentary function options. The advantage of such a rotary switch is that it is possible to control electronic functions on a vehicle in a flexible and logical way.

A method according to the invention for controlling a plurality of electronic functions by means of a spring-loaded rotary switch comprises (includes, but is not limited to) steps of activating a first function by a first pushing movement in from a neutral position and of activating a second function by a first pulling movement out from the neutral position. The advantage of this method is that it is possible to control electronic functions by means of a rotary switch in a simple and logical way.

In an advantageous further development of the method of the present invention, the method also comprises the steps of deactivating the first function by a second pushing movement in from the neutral position and of deactivating the second function by a second pulling movement out from the neutral position. The advantage of this is that the electronic functions can be deactivated either by an operator or automatically by the system without a mechanical return of the rotary switch being required.

In another advantageous development of the inventive method, the method also comprises the step of activating additional function(s) when the rotary switch is pushed in from a neutral position or pulled out from a neutral position a predetermined number of times during a predetermined interval of time. The advantage of this method is that it is possible to control electronic functions by means of a rotary switch in a simple and logical way.

In yet another advantageous development of the method performed according to the invention, a step is executed that includes activating additional function(s) when the rotary switch has been pushed in from a neutral position or pulled out from the neutral position for a predetermined interval of time by the first pushing movement or pulling movement, respectively. The advantage of this method is that it is possible to control electronic functions by means of a rotary switch in a simple and logical way.

In a fourth advantageous development, the method also comprises the step of activating a additional function(s) by means of a rotary movement when the rotary switch has been pushed in or pulled out respectively. The similar advantage of this development is that it is possible to control electronic functions by means of a rotary switch in a simple and logical way.

BRIEF DESCRIPTION OF DRAWINGS

The invention will be described in greater detail in the following, with reference to the embodiments that are shown in the attached drawing, in which:

The FIGURE is a schematic view of an exemplary rotary switch configured according to at least one embodiment of the invention.

DETAILED DESCRIPTION

The embodiments of the invention, including the several developments described herein are to be regarded only as examples, and in no way limit the scope of protection provided by the patented claims.

In a first embodiment of a rotary switch 1 configured according to the invention as illustratively shown the FIGURE, the rotary switch 1 has four rotational positions 3, 4, 5, 6. The different positions are set by a control element 2 which is turned to the required position. In this embodiment, the rotary switch is used to control the driving light functions; that is, parking lights, dipped/full beam of the headlamps, auxiliary light and fog lamps on a truck or other vehicle. The number of rotational positions of the rotary switch 1 may be varied, and is selected as required. Thus, for example, a rotary switch intended for a bus can have six rotational positions.

The light functions on the truck are controlled by a light module. This comprises, among other things, an input stage to which the rotary switch is connected, a control unit which decodes signals from the rotary light switch, and an output stage, for example relays or power semiconductors, which drive the load, in this case lamps. The control unit can comprise a computer, for example a processor with associated peripheral circuits such as a memory unit, to simplify making changes to and upgrading of the light control functions. The outputs of the light module can either be stable, that is an output is activated when a contact in the rotary switch is activated, or bistable, that is an output changes state each time a contact in the rotary switch is activated.

In this example, the rotary switch comprises only the switch element and no logic functions. It is also possible for the rotary switch to comprise a control unit and a memory unit that codes the signals. The light module will then comprise only the drive stage to the loads. The connection of the rotary switch to the light module can either be parallel or serial.

Position 3 of the rotary switch is a zero position in which all lights are switched off. For certain markets, the zero position can denote that a day running lamp function is activated when the vehicle is running. Position 4 is a parking position in which the parking lights are activated. Position 5 is a driving-light position in which full/dipped beam of the headlamps is activated. Position 6 is an auxiliary light position in which an auxiliary headlamp, for example long-distance beam, is activated when the full beam function is activated.

In addition, the rotary switch has two non neutral (relative to a third, neutral or "normal"), activation axial positions. These positions are used in this example to control the fog lamps on a truck. One position, here called the pushed-in position, is obtained by the control element being pushed in from the neutral position. When the control element is pushed in, a contact in the rotary switch sends a signal to the light module that means that an output is to be activated. In this example, this output drives the front fog lamps. The control element is spring-loaded so that it returns to its normal position (i.e., the neutral position) in the axial direction when the control element is released. This means that the signal that is sent to the light module is momentary.

The second position, here called the pulled-out position, is obtained when the control element is pulled out from the neutral or "normal" position. When the control element is pulled out, a contact in the rotary switch sends a signal to the control unit that means that an output is to be activated. In this example, this output drives the rear fog lamps. The control element is spring-loaded so that it returns to its normal position (i.e., the neutral position) in the axial direction when the control element is released. This means that the signal that is sent to the light module is momentary. The control element is advantageously designed so that its surface provides a good grip for being pulled out.

It is advantageous that attention is paid to the position of the rotary switch when the axial positions are to be activated. When the axial positions are used to control fog lamps, legal requirements in different countries can affect the circumstances in which fog lamps are able to be activated. For example, the front fog lamps must only be able to be activated in positions 4 and 5 of the control element. Thus, if the control element is in position 3 when the pushed-in position is activated, the light module can prevent the front fog lamps from being activated using a memory unit in which permitted combinations are stored.

The deactivation of the fog lamps can be carried out in various ways. As the axial positions of the rotary switch are spring-loaded, the outputs that are activated in these cases are bistable. The deactivation of an output is consequently carried out by carrying out the activation routine once more. The deactivation of, for example, the front fog lamps is carried out by pushing in the control element when the front fog lamps are activated. The output changes state each time the control element is pushed in.

Another way of deactivating the fog lamps is to turn the rotary light switch. If the rotary switch is turned to a position in which the fog lamps are not to be activated, the light module can deactivate the output that drives the fog lamps in question.

A third way of deactivating the fog lamps is to switch off the vehicle's engine. The outputs that drive the fog lamps can then be reset so that they are not activated the next time the vehicle's engine is started up. This is advantageous as the fog lamps cannot be left inadvertently in an activated state.

In those cases where the rotary switch is used for other functions than fog lamps, it is, of course, also possible to use a memory to memorize the state of the outputs when the vehicle's engine is switched off. This means that the outputs can be reactivated when the vehicle's engine is started up. An example of a function where this can be advantageous is, for example, heated mirrors.

As the control element is spring-loaded and the output that is controlled by an axial position has alternating states, it is advantageous to indicate the state of the output in such a way that the driver can easily see the state of the output. This is carried out most simply by illuminating a symbol located in a suitable position. In this embodiment, symbols 7, 8 are used to show the state of the outputs. The symbol is lit when the corresponding output is activated and extinguished when the output is deactivated. Here the symbol 7 indicates that the front fog lamps are activated and the symbol 8 indicates that the rear fog lamps are activated. The indication of the state of an output can also be carried out in another way. For example, a symbol representing the state of the output can be displayed in a character window in, for example, the vehicle's instrument panel. Where and how an indication is made can be controlled by legal requirements.

In a first embodiment of the method according to the invention for controlling a plurality of electronic functions by means of a spring-loaded rotary switch, the steps are included of activating a first function by means of a first pushing movement in from a neutral position and of activating a second function by means of a first pulling movement out from the neutral position. The first function is activated by pushing in the control element of the rotary switch. The second function is activated by pulling out the control element of the rotary switch. The control element of the rotary switch is spring-loaded so that it is normally in an intermediate position (i.e., the neutral position.

For example, the first function can be front fog lamps on a truck. When the control element is pushed in, the output is activated that drives the front fog lamps. The second function can be, for example, rear fog lamps on a truck. When the control element is pulled out, the output is activated that drives the rear fog lamps. The control element is spring-loaded so that it returns to its normal, neutral position in the axial direction when the control element is released.

As the axial positions of the rotary switch are spring-loaded, the outputs that are activated in these cases are bistable. This means that the outputs change state each time the control signal that controls the output is activated. The deactivation of a function is consequently carried out by carrying out the activation routine once more.

For example, the front fog lamps are deactivated by pushing in the control element when the front fog lamps are activated. As the output changes state each time the control element is pushed in, the front fog lamps are activated/deactivated each time the control element is pushed in. In the same way, the rear fog lamps are activated/deactivated. When the control element is pulled out when the rear fog lamps are activated, the rear fog lamps are deactivated. Next time the control element is pulled out, the rear fog lamps are activated again.

The functions that are controlled by the axial positions do not need to be fog lamps. For example, these positions can be used to control the functions "headlamp interrupt" and "marker interrupt". These functions are common in certain markets. The function "headlamp interrupt" means that the driving lights are extinguished when the control element is pushed in. The function "marker interrupt" means that the position lights on the vehicle are extinguished when the control element is pulled out. In these cases, the outputs are not alternating but are mono-stable. Other functions for which the rotary switch according to the invention can be used are sign illumination, plough lighting, lateral lights, fifth wheel illumination or additional reversing lights.

In an additional development of the method of the invention, additional function(s) can be activated when the rotary switch is pushed in or pulled out from the neutral position a number of times within an interval of time. For example, such a function can be activated when the control element is pushed in twice within one second. The deactivation of this function can be carried out by pushing in the control element a number of times within an interval of time. For example, the function can be deactivated when the control element is pushed in twice within one second. An example of such a function can, for example, be that the front fog lamps are not deactivated when the vehicle's engine is switched off. This can be advantageous, for example, for a delivery vehicle that stops frequently and where the driver wants to have the front fog lamps on when the vehicle is running. The indication that the function is active can be carried out by an illuminated symbol.

In a second development of the method according to the invention, additional function(s) can be activated when the rotary switch is pushed in or pulled out from the neutral position, respectively for a predetermined period of time. In this further development, a predetermined period of time is stored in the memory unit. When the control element is pushed in or pulled out, the control unit counts the time during which the control element is operated. If the operating time is longer than the predetermined period of time, a further function is activated. An example of such a further function can, for example, be that the front fog lamp is not deactivated when the vehicle's engine is switched off. This can be advantageous, for example, for a delivery vehicle that stops frequently and where the driver wants to have the front fog lamps on the whole time. The deactivation of this function can be carried out by holding the control element pushed in for the predetermined period of time once again. The indication that the function is active can be carried out by an illuminated symbol.

In a third development of the method of the present invention, additional function(s) can be activated when the control element is pushed in or pulled out from the neutral position, respectively at the same time as the control element is turned to a particular position. In this further development, the control unit detects that the control element is pushed in or pulled out at the same time as the control element is turned to a particular position. The control unit can detect either from which position the control element is turned, to which position the control element is turned or in which direction the control element is turned. Dependent upon what conditions have been stored in the memory unit, an additional function is activated. An example of such a seventh function can, for example, be that the front fog lamp is to be activated constantly when the vehicle is running if the vehicle has not been stopped for more than a predetermined waiting time, for example one hour. This can be advantageous, for example, for a delivery vehicle that stops frequently and where the driver wants to have the front fog lamps switched on throughout the whole of his shift. When his shift is finished and the vehicle is parked, the waiting time will be more than one hour, which means that when his next shift starts the front fog lamps are deactivated. The deactivation of this function can be carried out by holding the control element pushed in while at the same time turning the control element. The indication that the function is active can be carried out by an illuminated symbol.

The invention is not to be regarded as being limited to the embodiments described above, a number of additional variants and modifications being possible within the scope of the patented claims. The rotary switch can, for example, also be used for ships, vessels or within industrial automation.

The invention claimed is:

1. A method for controlling a plurality of electronic functions by means of a rotary switch with several spring-loaded axial positions, said method comprising the steps:
    activating a first function by a first pushing movement in from a neutral position;
    deactivating the first function by a second pushing movement in from the neutral position;
    activating a second function by a first pulling movement out from the neutral position; and
    deactivating the second function by a second pulling movement out from the neutral position.

2. The method as recited in claim 1, wherein at least one of the first and second functions is only activated when the rotary switch is in a predetermined position.

3. The method as recited in claim 1, wherein at least one of the first and second functions is deactivated when the rotary switch is operated.

4. The method as recited in claim 1, wherein the first function is front fog lamps and the second function is rear fog lamps.

5. The method as recited in claim 1, wherein the first function is headlamp interrupt and the second function is marker interrupt.

6. The method as recited in claim 1, further comprising:
    activating a third function when the rotary switch is pushed in from the neutral position a predetermined number of times during a predetermined interval of time.

7. The method as recited in claim 1, further comprising:
    activating a third function when the rotary switch is pulled out from the neutral position a predetermined number of times during a predetermined interval of time.

8. The method as recited in claim 1, further comprising:
    activating a third function when the rotary switch has been pushed in from the neutral position for a predetermined period of time by the first pushing movement.

9. The method as recited in claim 1, further comprising:
    activating a third function when the rotary switch has been pulled out from the neutral position for a predetermined period of time by the first pulling movement.

10. The method as recited in claim 1, further comprising:
    activating a third function by a turning movement when the rotary switch is pushed in from the neutral position.

11. The method as recited in claim 1, further comprising:
    activating a third function by a turning movement when the rotary switch is pulled out from the neutral position.

* * * * *